Hafer & Wilkinson,
Spoke Guide,
N°20,642.  Patented June 22, 1858.
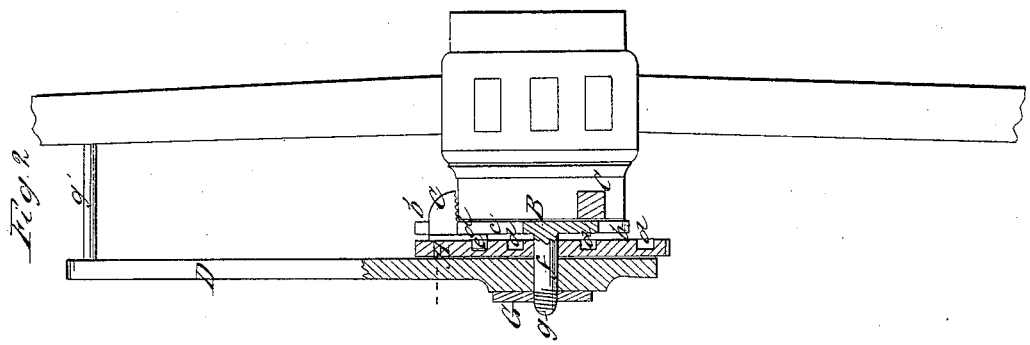
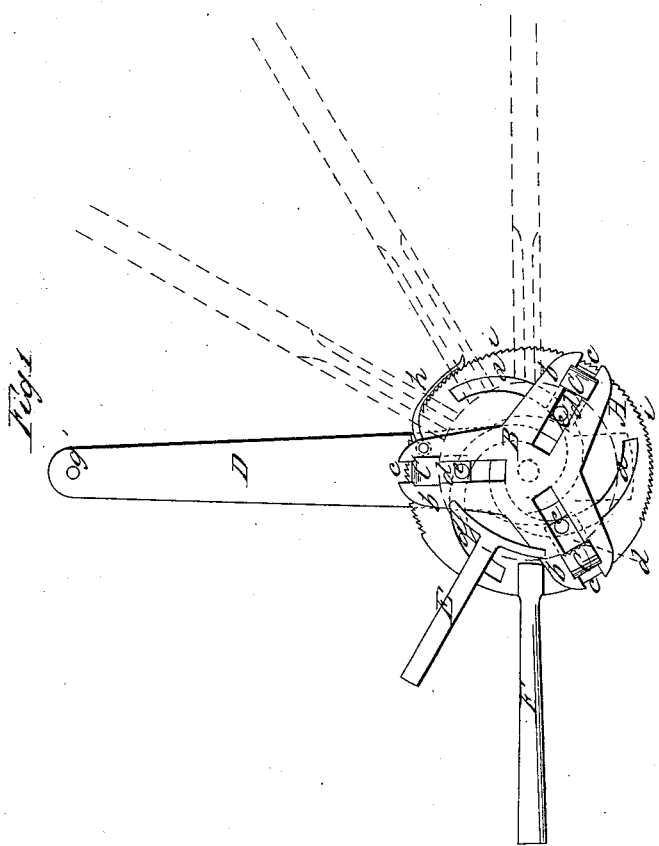

UNITED STATES PATENT OFFICE.

A. HAFER AND G. WILKINSON, OF COLON, MICHIGAN.

MACHINE FOR SETTING SPOKES IN HUBS.

Specification of Letters Patent No. 20,642, dated June 22, 1858.

*To all whom it may concern:*

Be it known that we, ANDREW HAFER and GEORGE WILKINSON, of Colon, in the county of St. Joseph and State of Michigan, have invented a new and useful Improvement in Guides for Setting Spokes in Wheels; and we do hereby declare that the following is a full, clear, and exact description of the same, reference being had to the annexed drawings, making a part of this specification, in which—

Figure 1 is an inner face view of our improvement. Fig. 2 is a central section of ditto.

Similar letters of reference indicate corresponding parts in the two figures.

This invention consists in a novel means employed for attaching the sweep to the hub as hereinafter fully shown and described, whereby the sweep may with the greatest facility be centered to the hub with perfect accuracy.

To enable those skilled in the art to fully understand and construct our invention we will proceed to describe it.

A, represents a circular disk in one side of which three curved grooves *a, a, a,* are made, said grooves being at equal distances apart and projecting outward from the center toward the periphery of the disk, see Fig. 1.

B, represents a plate having three radial arms *b, b, b,* each one of which is slotted longitudinally as shown at *c*, Fig. 1. In each slot *c*, of the arms *b*, a jaw C, is fitted, the sides of the jaws being recessed or grooved so that the edges of the arms at each side of the slots may fit therein and retain the jaws in the arms. Each jaw is formed on a slide *d*, to the under sides of which pins *e*, are attached, said pins being fitted in the curved grooves *a*, one in each.

From the center of the plate B, at one side, a pin *f*, projects, this pin passes through the center of the disk A, has a screw thread *g*, formed or cut on its outer end.

D, is a sweep which is fitted on the pin *f*, and allowed to turn freely thereon. The outer end of the sweep has a horizontal pin *g'*, attached to it as usual. To the plate B, a handle E, is attached, and a pawl *h*, is also attached to the plate B, said pawl catching into ratchet shaped teeth *i*, on the periphery of the disk A. A handle F, is also attached to the disk A. On the outer end of the pin *f*, a nut G, is placed.

In order to attach the sweep to the hub, shown in red, the plate B, is placed over its front end,—the operator grasps the handle A, and then shoves the plate B, around by means of the handle E. As the plate B, is turned the curved grooves *a*, actuate the jaws C, and force them toward the center of the plate B, the jaws all moving simultaneously and with equal speed. The jaws are pressed against the edge of the hub and secure the disk A, firmly to it and concentric with it. By this device it will be seen that the axis (the pin *f*) of the sweep will be at the center of the hub, and the sweep will consequently describe a true circle from the center of the hub forming a perfect guide for the setting of the spokes in the mortises therein and also for determining their length. The pawl *h*, prevents the casual movement of the plate B.

Having thus described our invention what we claim as new and desire to secure by Letters Patent, is,

The disk A, having teeth *i*, formed on a portion of its periphery, and curved grooves *a*, made in its inner face, the plate B, provided with slotted arms in which jaws C, are placed, the plate being provided with a pawl *h*, and handle E, and fitted to the disk by means of the pin *f*, and nut G, the pin forming the axis of the sweep D, the whole being combined and arranged as and for the purpose set forth.

ANDREW HAFER.
GEORGE WILKINSON.

Witnesses:
N. C. TENNEY,
I. A. TOMLINSON.